A. McKILLOP.
VEHICLE WHEEL.
APPLICATION FILED JULY 25, 1911.
1,034,271.
Patented July 30, 1912.
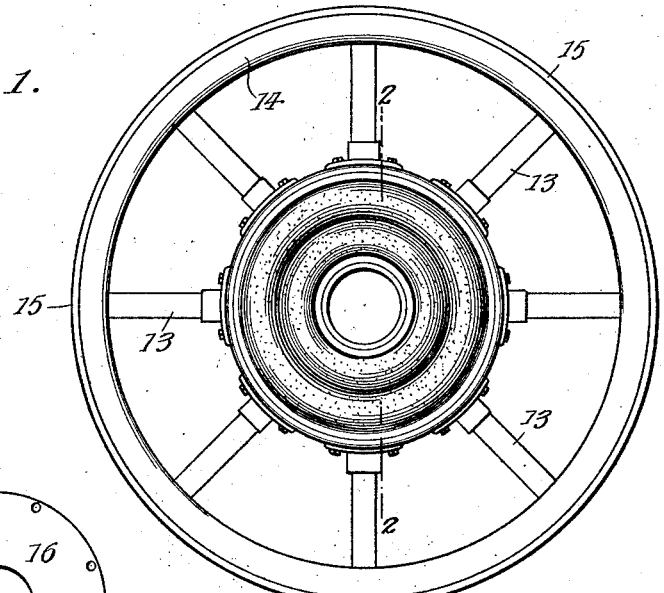
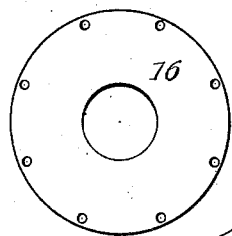
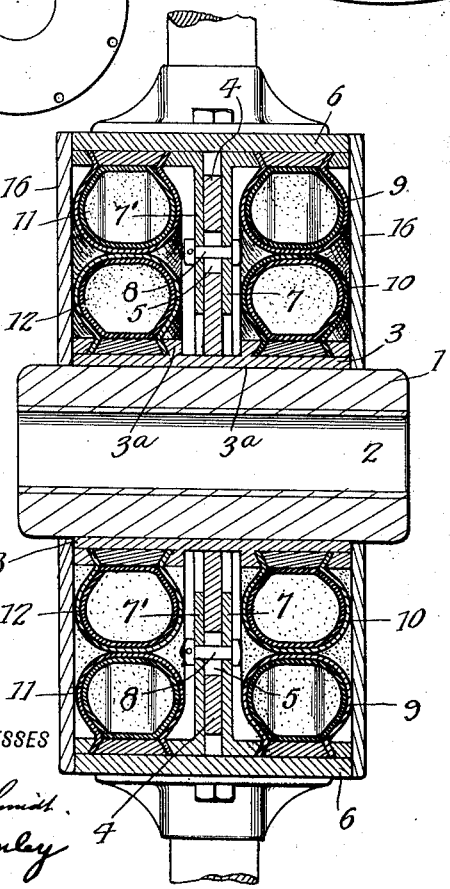
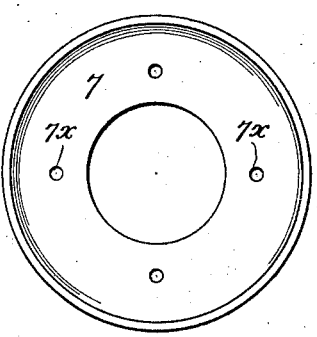
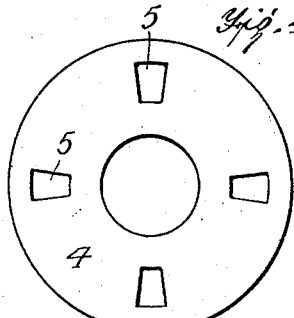
WITNESSES
L. H. Schmidt.
L. A. Stanley
INVENTOR
ANDREW McKILLOP
BY Munn&Co.
ATTORNEYS
COLUMBIA PLANOGRAPH CO., WASHINGTON, D. C.

UNITED STATES PATENT OFFICE.

ANDREW McKILLOP, OF ALLEGHANY, CALIFORNIA, ASSIGNOR OF ONE-FOURTH TO FRANCIS BORDINER DE LAUNEY, OF ALLEGHANY, CALIFORNIA.

VEHICLE-WHEEL.

1,034,271. Specification of Letters Patent. Patented July 30, 1912.

Application filed July 25, 1911. Serial No. 640,491.

*To all whom it may concern:*

Be it known that I, ANDREW McKILLOP, a citizen of the United States, and a resident of Alleghany, in the county of Sierra and State of California, have made certain new and useful Improvements in Vehicle-Wheels, of which the following is a specification.

My invention relates to improvements in elastic or resilient wheels for vehicles, and it consists in the combinations, constructions and arrangements herein described and claimed.

An object of my invention is to provide a resilient wheel, which will have the benefits of the ordinary pneumatic wheel, but in which the pneumatic member is not exposed to the wear of the ordinary pneumatic tire.

A further object of my invention is to provide a wheel having a series of pneumatic cushions disposed about the hub in such a manner as to take up shocks to which the wheel is subjected.

A further object of my invention is to provide a novel means for holding the cushions in their places, so as to permit the movement of the cushions relative to one another.

Other objects and advantages will appear in the following specification and the novel features of the device will be particularly pointed out in the appended claim.

My invention is illustrated in the accompanying drawings forming part of this application in which similar reference characters indicate like parts in the several views, and in which—

Figure 1 is a side view of the device, the outer covering plate being removed, Fig. 2 is an enlarged section along the line 2—2 of Fig. 1, Fig. 3 is a face view of one of the slidable plates, Fig. 4 is a face view of the central plate, and Fig. 5 is a face view of the cover plate.

In carrying out my invention, I provide a hub having a main body portion 1 provided with a bore 2 arranged to receive the axle of the vehicle. The body portion 1 has secured to it a sleeve 3 about the central portion of which is secured a plate 4 having openings 5 therein, as shown in Fig. 4. The sleeve 3 is provided with integral lugs 3ª, as shown in the figure. The sleeve 3 and body portion 1 constitute an inner hub portion.

An outer hub portion 6 is provided. This consists of a metallic ring to which are secured inwardly extending plates 7 on one side of the central plate 4, and similar plates 7' on the opposite side. The plate 7 is shown in face view in Fig. 3. As will be seen from this figure, it is provided with a series of perforations 7ˣ arranged to receive bolts 8 (see Fig. 2). The bolts pass through the openings 5 in the plate 4. It will be noticed that the openings are elongated, so as to permit a radial movement of the plates 7 and 7' with respect to the central plate 4.

Between the inner member 3 and the outer member 6, I arrange the resilient cushions 9 and 10 on one side of the slidable plates and similar cushions 11 and 12 on the opposite side. These cushions are similar to the clencher pneumatic tires, but, of course, are not tires in the ordinary sense of the word, since they do not form the exterior of the wheel. The cushions 9 and 11 are secured to the outer hub member 6, while the cushions 10 and 12 are secured to the inner hub member 3. When inflated the cushions have the appearance shown in Fig. 2. It will be noted that they are flattened at their contact edges. Secured to the outer hub member 6 are the spokes 13, which extend to the rim 14 about which is put a tire 15.

The wheel thus constructed is provided on each side with a plate 16 like that shown in Fig. 5 which covers the cushion, and thereby prevents the dust and dirt from working in between the cushions and enlarging them.

From the foregoing description of the various parts of the device the operation thereof may be readily understood. As the wheel revolves the pressure of the axle on the inner hub member causes the latter to move downwardly, the central plate 4 being permitted to move by the provision of the slots 5. The extent of this movement varies, of course, with the load, or the movement which is imparted to the vehicle. The shocks are taken up by the contacting resilient cushions, and the wheel thus acts as an ordinary wheel with a pneumatic tire.

The bolts 8 may be tightened to take up wear between the plates 4 and 7 or 7'.

Owing to the fact that the inner and outer hub members are slidably connected together there is not any tendency for the one set of cushions to rotate with respect to the other, and hence there is no sliding movement which might tend to wear the outer surfaces of the contacting cushions. When a strain comes the two contacting cushions are pressed against one another and tend to expand laterally after the manner of a pneumatic tire. As the wheel turns the strain is brought successively on various parts of the contacting portions of the two cushions.

I claim:

In a wheel, an inner hub, an annular plate secured to said inner hub member near the central portion thereof and projecting radially therefrom, said annular plate being provided with radially extending slots, an outer hub member, a pair of annular plates secured to said outer hub member and arranged to project inwardly toward said inner hub member, said inwardly projecting annular plates being provided with registering openings, said slotted plate being disposed between said inwardly projecting plates, bolts for securing said inwardly projecting plates together, said bolts passing through the slots in said slotted plate, an annular resilient cushion secured to said inner hub member on each side of said plates, an annular resilient cushion secured to the inner side of said outer hub member on each side of said plates and arranged to engage with its corresponding resilient member on the inner hub member, a series of spokes attached to said outer hub member, and a rim carried by said spokes.

ANDREW McKILLOP.

Witnesses:
JAMES F. HUNT,
MABEL E. QUINN.

---

Copies of this patent may be obtained for five cents each, by addressing the "Commissioner of Patents, Washington, D. C."